Patented June 17, 1930

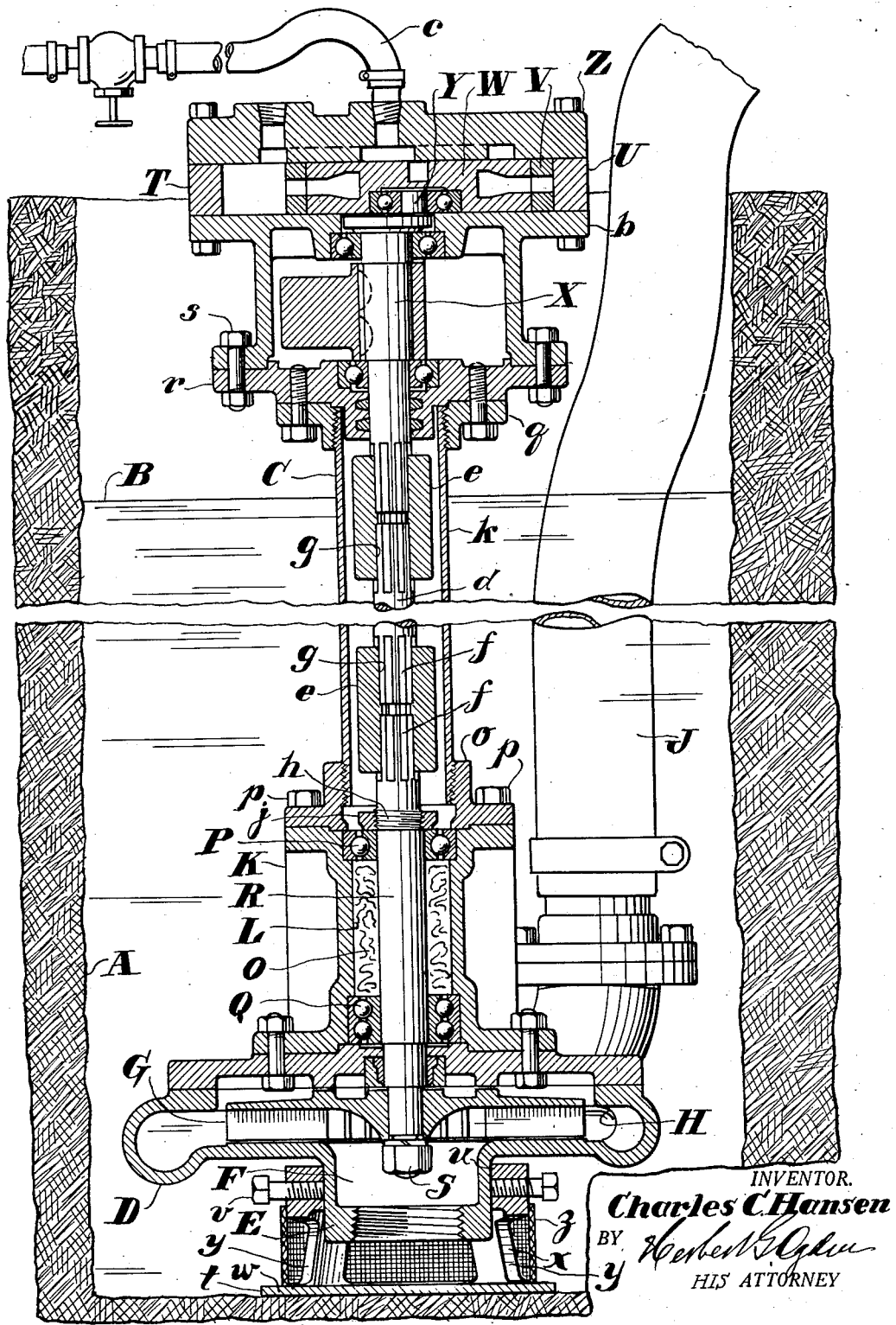

1,764,259

UNITED STATES PATENT OFFICE

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY

PORTABLE PUMPING UNIT

Application filed October 14, 1927. Serial No. 226,109.

This invention relates to pumps, but more particularly to a portable pumping unit adapted to be supported by the bottom of the container intended to be evacuated.

The objects of the invention are to provide a compact light-weight portable pumping unit in which the pumping element may be submerged in the liquid intended to be pumped, and to enable the unit to be supported in any convenient position on the bottom of the container intended to be evacuated.

Other objects will be in part obvious and in part pointed out hereinafter, and to all of these ends the invention consists of the combination of elements and arrangement of parts substantially as hereinafter described and claimed and illustrated in the accompanying drawing, in which, The figure is a sectional elevation of a pumping unit constructed in accordance with the practice of the invention.

Referring to the drawing, A designates a trench containing water B in which the pumping unit generally designated by C is partly submerged.

The unit C in this instance comprises a pump D of the open impeller type having at its front end a cylindrical flange E forming an inlet opening F through which the water may enter the pump. The water B drawn into the pump D by an open impeller G is discharged from the pump through an outlet H intended to be in registry with a flexible pipe or hose J through which the water B may flow from the vicinity of the trench A.

Attached to the rearward end of the pump D is a distance piece K having a central chamber L which may be filled with grease or other suitable lubricant O for lubricating anti-friction bearings P and Q seated in the upper and lower ends respectively of the distance piece.

The anti-friction bearings P and Q may be in the form of thrust bearings to take up the thrust of a shaft R which extends through the bearings P and Q and supports at its lowermost ends the impeller G. The impeller G may be keyed or otherwise suitably secured to the shaft R and is clamped against endwise movement with respect to the shaft R by a nut S threaded on the end of said shaft.

A power device in the form of a pressure actuated motor T is provided for imparting rotary movement to the impeller G. The motor T is preferably of the type commonly known as the Dake motor and comprises a cylinder U housing outer and inner flat pistons V and W respectively, the inner piston W being connected to a shaft X by means of a crank pin Y carried by the said shaft.

The motor T has the usual end heads Z and $b$ and to the end head Z in this instance is connected a pipe $c$ which conveys pressure fluid from a source of supply (not shown) to the motor.

Suitable means are provided for preventing the transmission of end thrust of the shaft R to the shaft X. To this end an intermediate shaft $d$ is interposed between the shafts R and X and held slightly spaced from the inner ends of the shafts R and X by means of couplings $e$. The contiguous ends of the shafts X and $d$, as well as those of the shafts R and $d$, are provided with splines $f$ which are in slidable engagement with corresponding splines $g$ formed in the couplings $e$.

Near the splined end of the shaft R are formed threads $h$ which, in the assembled position of the shaft, lie above the anti-friction bearing P. On these threads $h$ is threaded a nut $j$ to seat on the bearing P for limiting endwise movement of the shaft R in the bearings P and Q.

Means are provided for supporting the motor T above the surface of the water B and for securing the motor T rigidly to the pump D. These means preferably comprise a tube $k$ of a suitable length and threaded at its lowermost end into a flange $o$ secured to the distance piece K by means of bolts $p$. The opposite end of the tube $k$ is threaded into a flange $q$ forming part of a plate $r$ carried by the head $b$ and secured thereto by bolts $s$.

In order to enable the unit to be maintained in an upright position in the trench A, a base $t$ having a bore $u$ to receive the flange E is secured to said flange by means of set screws $v$. The base $t$ has an imperforate bottom plate w of ample proportions to prevent tilting of the unit and in the side walls x of the base are formed ports y through which the liquid from the trench may pass to the inlet opening F of the pump D.

Any suitable means may be provided for preventing solid matter entrained in the water from entering the pump D. The means illustrated consist of a wire screen z which encircles the base t and overlaps the ports y.

The present invention forms a compact and rugged pumping unit capable of efficient operation for prolonged periods of time without necessitating the constant presence of an attendant to assure its satisfactory operation. Due to its lightness of weight it may be readily transported from one location to another. Moreover, the expense of installation is negligible since the pump will operate satisfactorily in any position in which it may be placed.

I claim:

In a portable pumping unit, the combination of a rotary motor having a shaft, a pump having a shaft arranged coaxially with the shaft on the motor, an intermediate shaft between the pump and motor shafts, means slidably interlocking the intermediate shaft to the pump and motor shafts, a distance piece secured to the pump and having a chamber therein forming a reservoir for lubricant, frictionless bearings for the pump shaft seated in the distance piece and adapted to receive lubricant from the chamber, and a tube encircling the shafts and connected with its ends to the motor and the distance piece to support the motor above the surface of the liquid being pumped.

In testimony whereof I have signed this specification.

CHARLES C. HANSEN.